Feb. 13, 1923.                    1,445,362.
O. SCHWARZKOPF.
TOY BIRD SONGSTER.
FILED JAN. 12, 1922.
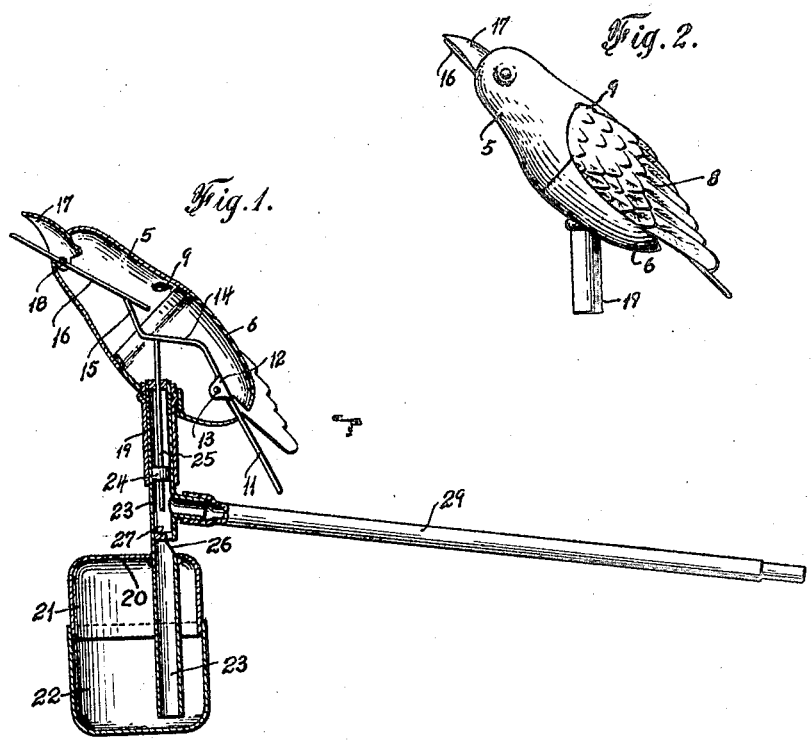
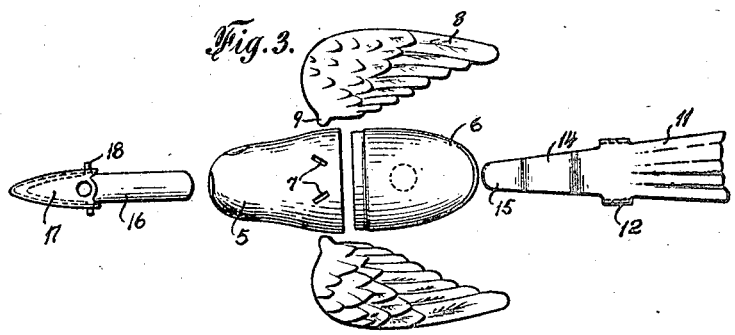
Inventor
Oscar Schwarzkopf
By James C. Ledbetter
Attorney Patented Feb. 13, 1923.

1,445,362

UNITED STATES PATENT OFFICE.

OSCAR SCHWARZKOPF, OF NEW YORK, N. Y., ASSIGNOR TO VICTORY SPARKLER & SPECIALTY COMPANY, OF ELKTON, MARYLAND, A CORPORATION OF DELAWARE.

TOY BIRD SONGSTER.

Application filed January 12, 1922. Serial No. 528,593.

*To all whom it may concern:*

Be it known that I, OSCAR SCHWARZKOPF, a citizen of the United States, residing at New York city, borough of Manhattan, in the county of New York and State of New York, have invented certain new and useful Improvements in Toy Bird Songsters, of which the following is a specification.

This invention relates to musical toys, and more particularly to improvements in canary bird songsters made to imitate the movements of a singing bird and produce the warble or trill thereof.

An object of this invention is to improve and simplify toy canary bird songsters so the same are practical for production in large quantities and sale at comparatively low prices. Furthermore, it is an object of this invention to produce a toy bird songster so simplified in construction that the musical whistle or warbling device is contained in the support which carries the bird, and which bird has movable body parts to imitate the movements of real birds; and furthermore, it is an object to manufacture the bird body in such a way that the same can be fitted together and assembled at very low cost.

The accompanying drawings illustrate an embodiment of the invention, and though there is illustrated and described a preferred form of construction and operation, I claim the right of protection as to such changes as may obviously come within the scope of the invention.

In the accompanying drawings, Figure 1 shows a vertical longitudinal section through the assembled toy bird.

Figure 2 shows the appearance of the completed bird unit, the same having been removed from its support.

Figure 3 illustrates a plan view of the principal parts of the body of the bird, the said parts being shown in disassembled and spaced relation.

Referring now more in particular to the drawings for a detailed description of the invention, there is shown a front body piece 5 and rear body piece 6 made of metal punchings, or spinnings, in such a way that the two parts telescopically engage and are thereby held in fixed position. Openings are made in the front and rear ends of these two body parts for the reception of a movable tail and bill. Slots 7 are cut in one body part to receive the wings. A pair of wings 8 have ears 9 formed thereon; and the ears are inserted in the slots 7 of the body and bent downwardly on the underneath side thereof to hold the wings in position. The wings are so constructed as to fold inwardly and fit in close relation with both body parts, thereby assisting in holding the entire bird body structure together.

A movable tail part 11 is made with turned down brackets 12 and is held in pivotal relation within the hollow body by a pin 13 so that the tail oscillates between the rear tips of the bird wings. The front end of the tail 11 is bent to form a substantially horizontal portion, as shown at 14, and the extreme front end is then bent upwardly, as shown at 15, to engage the bill of the bird. The bill is formed of a substantially straight piece 16 and is fastened to the upper bill part 17 by a pin 18. After the two bill parts 18 and 19 are fitted together, the bill assembly is then placed in the front end of the bird body and secured in position by a touch of solder so as to hold the bill 17 stationary and permit the lower part 16 to move up and down under the influence of the oscillating tail part 11. The bird body unit is supported on a short tube 19, and this completes the makeup of the body unit.

A reservoir is provided to hold liquid, such as water, to produce the warble or trill in the whistle; and this reservoir comprises the two parts 21 and 22 which telescope one into the other to form a water-tight receptacle. A tube 23 is anchored in the top reservoir part 21 so that the lower container 22 may be removed and filled with water. The bottom end of the tube 23 extends downwardly into the reservoir so as to be emersed in water; and the upper end of the tube 23 contains a plunger comprising a piston 24 fixed upon a rod or wire 25. This plunger 24—25 is adapted to reciprocate in the cylinder tube 23 under the action of air pressure and causes the tail and bill to oscillate up and down. A whistle orifice 26 is cut in the tube, and a plug 27 having a small air opening, is fitted in the tube at the orifice to produce a whistle just above the water reservoir.

A duct is soldered or otherwise anchored on the side of the tube 23; and a tubing 29, such as a flexible rubber piece, is placed over the duct. The tubing 29 is made of appropriate length so that it may be conveniently brought to the lips of the operator for the purpose of blowing air into the device.

In operation, the reservoir 22 is partly filled with water. The operator holds the toy by the reservoir and gently blows through the tubing which directs a stream of air downwardly and across the orifice 26, and in addition thereto air flows down into the reservoir and escapes through a vent hole 20 made in the top thereof; and likewise the air pressure works against the piston 24 to oscillate the tail and bill. The action of the air in passing over the whistling orifice and through the water produces a warbling trill distinctively imitative of a canary songster; and in addition to the musical notes produced as described, the plunger causes the bill and tail parts to move up and down, thereby producing in appearance and tone, the action of a real canary bird. The toy is, therefore, pleasingly useful to amuse children and those appreciative of artistic and musical toys.

Having described my invention, what I claim is:

1. A toy bird songster comprising a two-piece body pressed together to form a hollow bird structure, wings applied to one of the body pieces and overlapping the other body piece so as to hold the two body pieces together, a movable tail and bill part pivotally mounted in the body, a warble whistler to sound notes in operative conjunction with the tail and bill parts, and means actuated by the whistle to operate the tail and bill parts.

2. A toy bird songster comprising a liquid receptacle, a tube fixed to the receptacle and having one end extending into the receptacle, a toy bird mounted upon the other end of the tube, a whistle made in the tube, a movable bird tail and bill part, and a plunger adapted to be reciprocated by the air pressure which sounds the whistle, and said plunger acting to operate the tail and bill part.

3. A toy bird structure embodying body parts pressed and connected together along a seam centrally of the body, bird wings, an aperture and ear construction arranged to secure the wings to the body disposing the wings over the seam, and a tubular support anchored to the structure by which the bird is held in service position.

4. A musical toy consisting of a songster bird perched on a tubular support, a water reservoir acting as a base to hold the support, a whistle made in the support, a plunger contained in the support to vibrate the bill and tail of the bird, and an air duct connected to the tubular support to transmit air to blow the whistle and work the plunger.

5. A musical toy consisting of a songster bird having a movable body part, a water reservoir, a tube secured to the bird, and another tube secured to the water reservoir and made to telescope into the first named tube to form a support for the bird, a whistle made in the telescoped tubular support, a plunger mounted in the tubular support to operate the movable bird parts, and an air duct made on the tubular support thru which is blown air to sound the whistle and vibrate the movable body parts.

In testimony whereof I have affixed my signature at the city of New York, county and State of New York, this 6th day of January, 1922.

OSCAR SCHWARZKOPF.